(12) United States Patent
Sadler

(10) Patent No.: US 8,578,473 B2
(45) Date of Patent: Nov. 5, 2013

(54) SYSTEMS AND METHODS FOR INFORMATION SECURITY USING ONE-TIME PAD

(75) Inventor: Lloyd W. Sadler, Allentown, PA (US)

(73) Assignee: LSI Corporation, Allentown, PA (US)

(*) Notice: Subject to any disclaimer, the term of this patent is extended or adjusted under 35 U.S.C. 154(b) by 806 days.

(21) Appl. No.: 12/411,389

(22) Filed: Mar. 25, 2009

(65) Prior Publication Data

US 2010/0246811 A1    Sep. 30, 2010

(51) Int. Cl.
*G06F 21/00* (2013.01)

(52) U.S. Cl.
USPC ............ 726/18; 726/17; 726/19; 726/28; 713/183

(58) Field of Classification Search
None
See application file for complete search history.

(56) References Cited

U.S. PATENT DOCUMENTS

| | | | |
|---|---|---|---|
| 5,297,207 A | 3/1994 | Degele | |
| 5,799,090 A | 8/1998 | Angert | |
| 5,826,016 A * | 10/1998 | Ito et al. | 726/18 |
| 6,003,133 A * | 12/1999 | Moughanni et al. | 726/4 |
| 6,094,483 A | 7/2000 | Fridrich et al. | |
| 6,215,689 B1 | 4/2001 | Chhor et al. | |
| 6,324,287 B1 * | 11/2001 | Angert | 380/43 |
| 6,802,000 B1 * | 10/2004 | Greene et al. | 713/184 |
| 7,035,700 B2 | 4/2006 | Gopalan et al. | |
| 7,644,860 B2 | 1/2010 | Matsushita et al. | |
| 7,861,094 B2 | 12/2010 | Klein | |
| 8,068,612 B2 | 11/2011 | Appenzeller et al. | |
| 8,161,527 B2 | 4/2012 | Curren | |
| 8,244,211 B2 | 8/2012 | Clark | |
| 2002/0191786 A1 | 12/2002 | Marroquin | |
| 2005/0273845 A1 | 12/2005 | Urano et al. | |
| 2006/0080545 A1 * | 4/2006 | Bagley | 713/183 |
| 2007/0074276 A1 | 3/2007 | Harrison et al. | |
| 2007/0101152 A1 * | 5/2007 | Mercredi et al. | 713/185 |
| 2008/0031456 A1 * | 2/2008 | Harrison et al. | 380/278 |
| 2008/0034216 A1 * | 2/2008 | Law | 713/183 |
| 2008/0072058 A1 * | 3/2008 | Cedar et al. | 713/184 |
| 2008/0140572 A1 | 6/2008 | Jackson | |
| 2008/0208758 A1 | 8/2008 | Spiker et al. | |
| 2008/0276098 A1 * | 11/2008 | Florencio et al. | 713/183 |
| 2009/0013402 A1 * | 1/2009 | Plesman | 726/18 |
| 2009/0158033 A1 * | 6/2009 | Jeong et al. | 713/156 |
| 2009/0241182 A1 | 9/2009 | Jaber et al. | |
| 2010/0091995 A1 | 4/2010 | Chen et al. | |
| 2011/0101093 A1 | 5/2011 | Ehrensvaerd | |

OTHER PUBLICATIONS

B. Anckaert, "Practical Data Location Obfuscation," Microsoft Research, Jan. 2009, Technical Report MSR-TR-2009-3.*
D. D Ristanovic, "The Book Cipher Algorithm," Dr. Dobb's, Sep. 24, 2008, Accessed Sep. 20, 2011, Retreived http://drdobbs.com/article/print?articleId=210603676&siteSectionName=.*
R. J. Anderson, "On the Limits of Steganography," IEEE Journal on Selected Areas in Communications, vol. 16, No. 4, May 1998, pp. 474-481.*

(Continued)

*Primary Examiner* — Jung Kim
*Assistant Examiner* — Robert Leung

(57) ABSTRACT

A method of verifying a password and methods of encryption and decryption using a key generated from a one-time pad. In one embodiment, the method of verifying includes: (1) receiving a password attempt, (2) retrieving a pointer from memory, (3) searching a one-time pad based on the pointer to retrieve a password, (4) comparing the password attempt with the password and (5) generating a new pointer if the password attempt matches the password.

6 Claims, 7 Drawing Sheets

(56) References Cited

OTHER PUBLICATIONS

R. Wong, et al, "Polonius: An Identity Authentication System," pp. 101, 1985 IEEE Symposium on Security and Privacy, 1985.*
Wagner, N. R., "The Laws of Cryptography: Perfect Cryptography: The One-Time Pad," 2002, Retrieved Jul. 16, 2012, Online: http://www.cs.utsa.edu/~wagner/laws/pad.html.*
Haller, et al. "A One-Time Password System," Network Working Group, RFC: 2289, Feb. 1998, Retrieved Jul. 16, 2012, Online: http://tools.ietf.org/pdf/rfc2289.pdf.*
"System for Data Security Using User Selectable One-Time Pad"; U.S. Appl. No. 12/411,362, filed Mar. 25, 2009.
"Device for Data Security Using User Selectable One-Time Pad"; U.S. Appl. No. 12/411,375, filed Mar. 25, 2009.
"Computer Storage Apparatus for Multi-Tiered Data Security"; U.S. Appl. No. 12/411,391, filed Mar. 25, 2009.
"Running key cipher," Wikipedia, Jun. 2, 2008, 1 page.
Beale, J., "Security Through Obscurity Ain't What they Think It Is," Bastille Linux Project, 2000, Accessed Sep. 9, 2012, Online: http://portknocking.org/docs/security-through-obscurity-beale.pdf, 4 pages.
Drajic, D., "An Elementary Introduction to Cryptography," South Eastern Europe Conference on Regional Security through Data Protection, Dec. 1, 2003, pp. 1-14.
Duraiswamy, K., "Security Through Obscurity," May 30, 2005, Accessed Sep. 4, 2012, Online: http://www.rootsecure.net/content/downloads/pdf/security_through_obscurity.pdf, 7 pages.
Simmons, G. J., "The Prisoners' Problem and the Subliminal Channel," in Proceedings of CRYPTO'83, 1984, pp. 51-67.
Wikipedia, "Offset (computer science)," Feb. 22, 2009, Accessed Jan. 13, 2012, http://en.wikipedia.org/w/index.php?title=Offset_(computer_science)&oldid=272475789, 1 page.

* cited by examiner

SYSTEMS AND METHODS FOR INFORMATION SECURITY USING ONE-TIME PAD

CROSS-REFERENCE TO RELATED APPLICATIONS

This application is related to the following U.S. patent applications, which are commonly assigned herewith and incorporated herein by reference:

Ser. No. 12/411,362, filed by Sadler on even date herewith and entitled "System for Data Security Using User Selectable One-Time Pad;"

Ser. No. 12/411,375, filed by Sadler on even date herewith and entitled "Device for Data Security Using User Selectable One-Time Pad;" and Ser. No. 12/411,391, filed by Sadler on even date herewith and entitled "Computer Storage Apparatus for Multi-Tiered Data Security."

TECHNICAL FIELD

This application is directed, in general, to cryptographic systems and methods and, more specifically, to systems and methods for data security using a one-time pad.

BACKGROUND

Data security has been a concern in data storage for many decades. Presently, two approaches are derived to secure stored data.

The most conventional approach to secure stored data is to use a password. Unfortunately, passwords suffer two major shortcomings. First, they are not particularly difficult for a unauthorized person to discover, for example, by the user's having written it down, by knowing information about the user that can lead to an educated guess, by brute-force trial-and-error experimentation, or by exploiting a password resetting mechanism. Second, even without the password, an unauthorized person can exploit architectural weaknesses in the system in which the data is stored to bypass the password and gain direct access to the data.

The second approach to secure stored data is to encrypt the data using an encryption key. Although encryption generally lacks the above-described disadvantages of passwords, encoding of the stored data has several of its own problems. First, encryption typically introduces into substantial inefficiencies into the data and its storage, because encryption often requires additional storage for the encrypted data and/or additional processing to gain access to and subsequently store the data. Second, encryption typically uses one of a small number of mathematical techniques to encrypt the data. The techniques can consume significant processing resources. Third, virtually all encryption techniques fall short of being "perfect" in that the encrypted data contains embedded information which, given sufficient time and processing resources, can be used to break the encryption. Accordingly, once the mathematical encryption technique is identified or sufficient quantities of encrypted data are acquired, it is often possible to decrypt the data. As processing power, including the processing power demonstrated by vast networks of otherwise independent computers, increases the amount of time and effort required to break an imperfect encryption code decreases. While encrypting with random number sequences can address some of these problems, few absolute random number encryption approaches are readily available in the context of deterministic digital computer systems.

SUMMARY

One aspect provides a method of verifying a password. In one embodiment, the method of verifying includes: (1) receiving a password attempt, (2) retrieving a pointer from a computer memory, (3) searching a one-time pad stored in the computer memory based on the pointer to retrieve a password, (4) comparing the password attempt with the password and (5) generating a new pointer if the password attempt matches the password.

Another aspect provides a method of encryption using a key generated from a one-time pad. In one embodiment, the method includes: (1) generating a pointer, (2) receiving a message to be encrypted, (3) retrieving a key from a one-time pad based on the pointer and having a length at least equaling a length of the message, (4) applying a cryptographic function characters of the message based on characters of the key, (5) causing the message to be stored in a memory device and (6) generating a new pointer.

Yet another aspect provides a method of decryption using a key generated from a one-time pad. In one embodiment, the method includes: (1) receiving a password, (2) receiving a message to be decrypted, (3) retrieving a key from a one-time pad based on the password and having a length at least equaling a length of the message, (4) applying a cryptographic function to characters of the message based on characters of the key, (5) causing the message to be stored in a memory device and (6) generating a new pointer.

BRIEF DESCRIPTION

Reference is now made to the following descriptions taken in conjunction with the accompanying drawings, in which.

DETAILED DESCRIPTION

Figure 1:
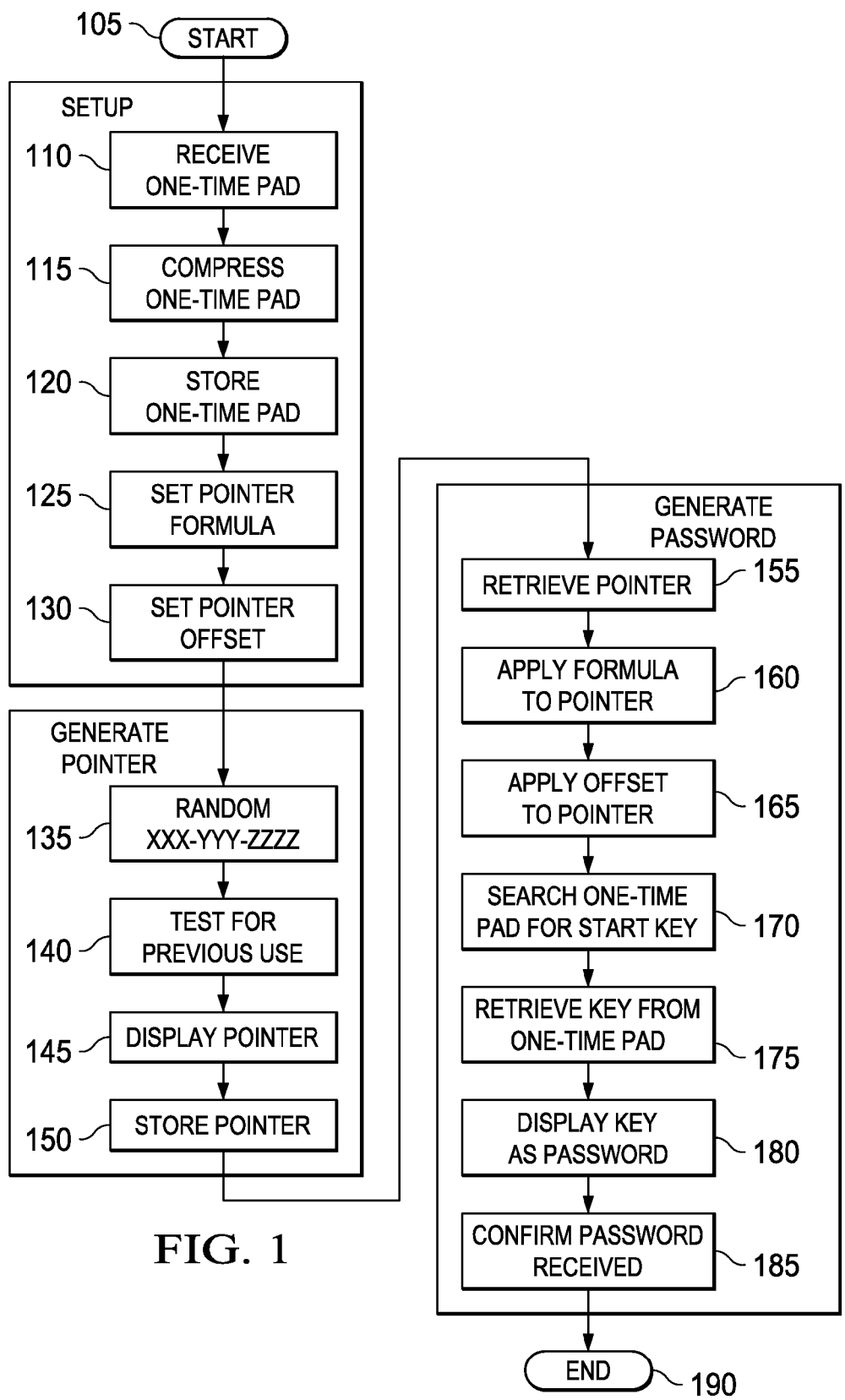
FIG. 1 is a flow diagram of one embodiment of a method of storing a one-time pad in a nonvolatile memory and generating a pointer and password.

Described herein are various embodiments of a system for securing data. The system makes use of a user selectable one-time pad and a generated pointer employed to derive a key from it. The key can be then used either as a passcode for access to secured data or, in an alternative embodiment, as a data encryption key to decrypt the secured data.

Various of the embodiments are substantially superior to the conventional one-time pad approach for data communication or storage. Specific embodiments address the deficiencies described below with respect to one-time pad encryption, which have plagued their real-world application. Certain of the embodiments described herein make use of a multi-tiered security approach, allowing password recovery without requiring a "system" password or a third-party with the ability to grant access to the data or change the user's password.

Since the concept of a one-time pad is important to an understanding of the teachings herein, a brief introduction into the one-time pad will now be undertaken. A one-time pad, also sometimes called a Vernam cipher, is often referred to as the one "perfect" encryption method. It is considered "perfect" because it is provably mathematically impossible to cryptanalyze one-time pad encoded information. In the context of cryptography, the term "perfect" means that an unauthorized person has no more information about the plaintext after he receives the ciphertext than before he received it. The one-time pad is known as the simplest "perfect" encryption technique. Without knowledge and information outside that contained in the ciphertext, the one-time pad technique has been demonstrated to be completely unbreakable.

In most common uses, the one-time pad is a variation on the Beale cipher. During typical use, the one-time pad approach combines the plaintext of a message with a random key selected from the one-time pad. For example, starting with a random series of letters for standard text, from the one-time pad as the key, then combining this series of letters with the message text creates the encrypted message. According to Shannon, "Communication Theory of Secrecy Systems," available online at, for example, netlab.cs.ucla.edu/wiki/files/shannon1949.pdf, four rules must be followed in order to make an encryption using a one-time pad communication unbreakable. These rules are as follows:

1. The key, derived from the one-time pad, must be at least as long as the plaintext message being encrypted.

2. The key must be mathematically random, in other words, such a key cannot be generated by a deterministic computer algorithm.

3. Only two copies of the key should exist: one for the sender and one for the receiver (some exceptions exist for multiple receivers).

4. The key is only used once. Both the sender and the receiver should destroy their copies of the key after its use.

These rules are modified in some embodiments described herein. Therefore, the system disclosed hereby may be regarded as a derivation of the one-time pad approach. In various of those embodiments:

1. The one-time pad is longer, and likely much longer, than the key derived from it. The key is derived from the one-time pad beginning at a pointer location and continuing as long as necessary.

2. The key achieves its "randomness" through use of a modified pointer that points to a location within a user-selected text known only to the user.

3. While multiple copies of the key and the one-time pad are available, only the user and the protected system have information identifying the specific user-selected text as the one-time pad. As long as knowledge that the user-selected text is being used as a pad for the selection of a key is confined to the user, the text operates as a random one-time pad.

4. The key, derived from the one-time pad, is only used once for encryption since it is identified from a modified pointer, which is used only once.

One-time pads have been used as a means of encrypting messages for some time. However, because conventional one-time pads are long lists of random characters (as noted above, the list of random characters must be at least as long as the message itself) the one-time pads, which the user must possess to code and decode messages as the key to the coded data, are easily identified as one-time pads by knowledgeable observers. ("Random," as that term is used herein, means at least pseudorandom, and therefore not necessarily mathematically random.) Moreover, because one-time pads are primarily used to communicate between two or more individuals, multiple identical copies of the one-time pads are often necessary. Accordingly, the use of one-time pads as an encryption technique has been limited by these requirements for multiple copies of long lists of random characters. When long lists of random characters are generated, their appearance betrays their use as an encryption key. Further, when multiple copies of such a long lists of random characters are made, an opportunity exists to create additional unauthorized copies of the one-time pad, such unauthorized copies can then be used to attack the encrypted data directly.

Various of the embodiments address these limitations by substituting for the long list of random characters (which conventionally made up the one-time pad) a user-selected document, the use of which as a one-time pad the user maintains as a secret. Because the user-selected, common document substantially lacks random lists of characters and has substantial standalone linguistic use (i.e., employs a written language to communicate) independent of any role it may have in encryption, the user-selected document is defined as a "common document." This user-selected, common document is used with a combination of a pseudorandom pointer, selected by the computational system, and a user-selected formula, which is applied to the pointer to identify the starting point of the key in the one-time pad. The "key," extracted from the one-time pad, is used as a one-time password and/or as an encryption key for the encryption of a stored file or data in the computational system. Of course, the same key would be expected to be used for subsequent decryption, since the encryption is symmetric.

Accordingly, in various of the embodiments, the one-time pad is based on a user-selected, common document rather than a list of random characters. The one-time pad, thus derived, is effectively random because (1) only the user is aware of the common document, and (2) by using a user-selected algorithm or formula which is applied to a computationally generated pseudorandom pointer for selecting characters, typically the starting point of the key, from the common document (or one-time pad), a series of characters with the attributes of a random series can be effectively generated. Moreover, a common document used as a one-time pad is actually more secure than a random series of characters, since, as noted above, a user heretofore had to possess a one-time pad containing the random series of characters used as a key. This common document, if discovered, is readily identifiable as a series of random characters, belying its likely use in encryption. In contrast, a common document, such as a book, would be known only to the user, and its existence or discovery would not appear out of place as a one-time pad by anyone who discovers it, especially when located among a collection of books or like common documents. Moreover, a user heretofore had to retain a one-time pad containing a series of random characters, because if it is lost, the ability to decrypt the data from the secure communication channel is also lost. In contrast, certain of the embodiments allow the use of a common document as a one-time pad that need only be available, not retained.

As an example, suppose a user selects as a one-time pad the 2004 edition of the Oxford American Writer's Thesaurus. This edition of the Thesaurus is demonstrably readily available in libraries, book stores and online. Were the user to lose or misplace his or her own copy of this one-time pad, a replacement copy could be readily obtained without attracting suspicion or giving away its use as a one-time pad. The three principle drawbacks of the use of one-time pad security are thus addressed.

1. Conventional one-time pads require mathematically random one-time pads, which are not only somewhat difficult and costly to generate, they are essentially impossible to recover if lost and, if detected, are easily identifiable as one-time pads. Since the randomness in certain embodiments of this disclosure is addressed through a user-only known algorithm applied to a random pointer to a particular specific location in a user-only known common document, effective apparent randomness is accomplished in a manner that is appropriate to use in a deterministic computer system.

2. The one-time pad must be at least as long as the message. Since this disclosure uses a common document, typically a long common document such as a booklength manuscript, as the source material for the pre-processed pad, in order to produce a short message or password, certain embodiments described herein virtually assure that the one-time pad will always be capable of being substantially longer than the message. As described herein, the common document that forms the one-time pad is stored in the secured system, after being selected and entered by the user. The storage is typically carried out in a compressed or uncompressed form within a one-time programmable electronic memory device. In one embodiment, the one-time programmable memory device is adapted to ensure that the data stored is not accessible if the device is removed, examined or accessed by an unauthorized person.

3. To preserve security, the one-time pad should be maintained as a secret from all unauthorized persons, and a particular pad sequence should be used only once. This disclosure addresses the secrecy issue through the use of a user selectable common document as a pad. The common document draws no attention to itself. In other words, an unauthorized person is faced with the problem of attempting to find the correct common document without having any information as to the characteristics that distinguish the correct common document from all others.

Moreover, as introduced above, certain embodiments call for the start pointer to be generated during setup (for the first use) or subsequently during a previous communication. In one embodiment, the start pointer points directly to the first character of the key within the one-time pad, while in other embodiments, the first character of the key is identified by an offset applied to the start pointer. In still other embodiments, the user is provided with the capability of selecting an algorithm for identifying the key from the start pointer. This use of a previously generated pointer means that an unauthorized user would have to have access to both the one-time pad (the user-selected, common document) and the pointer generated during the user's previous authorized use of the system to compromise the encryption. Moreover, because an additional tier of security may be provided by transforming the pointer with a user-selected formula, the unauthorized user would also need to know this formula in order to determine where in the one-time pad to look for the start of the key. A multi-tiered approach to security may therefore result, made up of: (1) a secret pad, (2) a secret formula applied to a pointer, and (3) a secret pointer, which after application of the secret formula, points to the key, either directly or with an offset, within the secret pad. Each of these secrets would need to be compromised for an unauthorized user to gain access to the encrypted data. In one embodiment, the starting point or "pointer" (e.g., page, line and word, or chapter, paragraph and character) to be used during the next communication is pseudorandomly generated by the system and confirmed that it has never been previously used before being communicated to the user. In an alternative embodiment, the user selects the pointer and communicates it to the system.

In various embodiments, the "pointer" is stored in the system by embedding it within data in a file. Multiple pointers, perhaps with links among the pointers and their associated data or files, may be maintained in various embodiments. In one specific embodiment, a steganographic technique is employed in which one or more pointers are converted to binary form and embedded in one or more image or sound files. If detected, they would appear to be noise or encoding errors and difficult to discern as important.

In one embodiment, the pointer is provided to the user is formatted such that it appears to be a telephone number (i.e., xxx-yyy-zzzz), so that the user can write it down if necessary without giving away its purpose. As above, the pointer may relate to a page, line and word, or alternatively to a chapter, paragraph and character, for the beginning of the key, or some other combination that can uniquely identify a starting character in a common document that serves as a one-time pad. Accordingly, other pointer references are possible and likely without departing from the scope of the invention.

Continuing the example that employs the 2004 Oxford Thesaurus as a one-time pad, a typical pointer may be represented as "610-712-2158," interpreted as a pointer to page 610, line 12, word 8, namely the word "Kafkaesque" as the start of the key for the current code or as the password for the current session on the system. In another embodiment, the user defines a formula at setup, which is applied to modify the pointer to point to the start of the one-time pad for the current use. In a related embodiment, an offset can be applied to the modified formula to obscure the key further. For example, the following formula to the pointer may be selected:

Page #=truncate[0]($xxx$/7),

Line #=two least significant digits of $yyy$+11, and

Word #=$zzzz$–1957->middle two digits summed together.

This formula (which is typically selected by, and therefore typically known only to, the user) leads to the following start pointer or password pointer to the one-time pad for the pointer representation "610-712-2158", viz.:

Page #=610/7=87.14; truncate[0]87.14=87; therefore Page 87,

Line #=two least significant digits of (712+11=723) or 23, and

Word #=2158–1957=0201 middle two digits being 2 and 0, summed together=2.

Therefore, the pointer to the beginning of the key or to a session password, derived from the previously generated pointer of "610-712-2158" and used in the one-time pad would be Page #87, Line #23, Word #2, pointing to the word "Talk."

In the illustrated embodiment, since (1) only the user knows the common document of the "one-time pad" (in this example the 2004 Oxford American Writer's Thesaurus), (2) only the user knows the user-selected applied formula (in this example: Page #=truncate[0] ($xxx$/7); Line #=two least significant digits of $yyy$+11; Word #=$zzzz$–1957->use least middle two digits summed together) and (3) a new pointer is generated for each use from the previously session (in this example "610-712-2158"), the one-time pad starting point, defining the key within the one-time pad, is secure.

In various embodiments, the following four features, among others, may be regarded as novel and nonobvious, either alone or in combination:

1. Use of a user-selected, common document as a one-time pad. In the illustrated embodiment, the user-selected, common document is a published long-form written common document, which is scanned into the system for storage in an uncompressed or compressed form in the one-time programmable protected circuit.

2. Use of a pseudorandom series selected from the one-time pad as the password and/or encryption key. In the illustrated embodiment, the pointer to the beginning of the one-time key is generated in a pseudorandom fashion automatically by the system for each use during the (or alternatively "a") previous use and, after it is checked to ensure that it has not been previously used, is communicated to the user.

3. Use of a one-time programmable protected circuit for the storage of the one-time pad.

4. Use of a storage device to store the pointer within a common document in a manner that is not readily apparent, e.g., embedded within a digital photograph or a music file.

FIG. 1 is a flow diagram of one embodiment of a method of storing a one-time pad in a nonvolatile memory and generating a pointer and password. The method begins in a start step 105 and, in general, includes steps directed to setting up a one-time pad for use, steps directed to generating a pointer and steps directed to setting up a password.

The steps directed to setting up a one-time pad for use include a step 110 in which the one-time pad is received and a step 115 in which the one-time pad may be compressed if desired, a step 120 in which the one-time pad is stored, a step 125 in which a pointer formula is set and a step 130 in which a pointer offset is set. Any conventional or later-developed technique may be employed to compress the one-time pad if compression is desired in a particular application. In one embodiment, the formula is a user-selected formula. In a more specific embodiment, the user provides the formula as an input. In one embodiment, the offset is a user-selected offset. In a more specific embodiment, the user provides the offset as an input. Of course, various embodiments may omit one or both of the formula and the offset.

The steps directed to generating a pointer include a step 135 in which a number is at least pseudorandomly generated. As FIG. 1 illustrates, the number may assume an innocuous form (e.g., such that it appears to be a telephone number). In a step 140, the number is tested to confirm that it has not been previously used (i.e., compared to previously-used numbers). In a step 145, the pointer is displayed (i.e., caused to form at least part of an image on a display device). In a step 150, the pointer is stored in a memory device.

The steps directed to generating a password include a step 155 in which the pointer stored in the step 150 is retrieved from the memory device, a step 160 in which the formula set in the step 125 is applied to the retrieved pointer, a step 165 in which the offset set in the step 130 is applied to the result of the step 160 and a step 170 in which the result of these operations is employed to search the one-time pad that was stored in the step 120. A key, which as described above may be employed as an encryption key, a decryption key or a password or put to other use, is retrieved from the one-time pad in a step 175. In the particular embodiment of FIG. 1, the key is being employed as a password. Accordingly, in a step 180, the key is displayed as a password. In a step 185, confirmation is received that the key has been received. A user may supply the confirmation, for example. The method ends in an end step 190.

Figure 2:
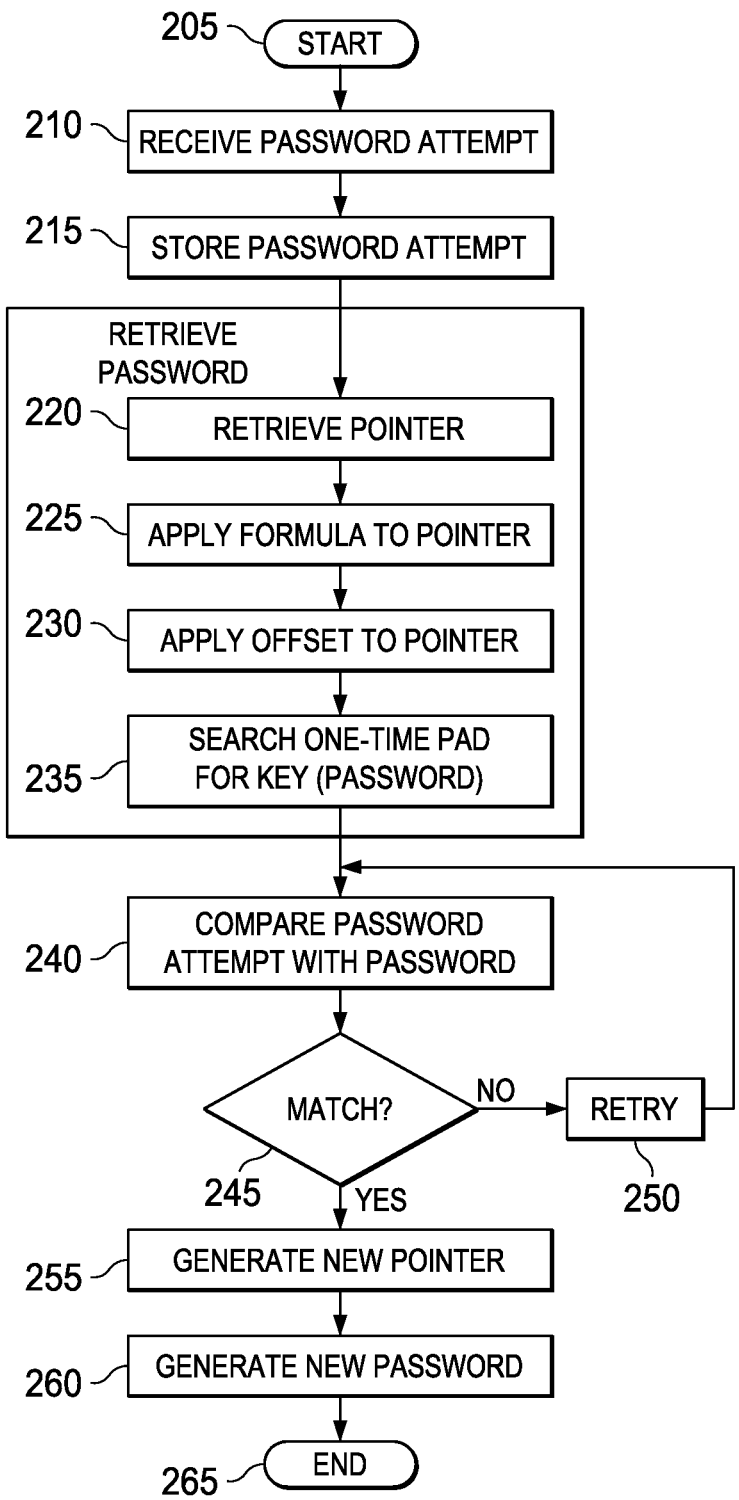
FIG. 2 is a flow diagram of one embodiment of a method of verifying a password.

FIG. 2 is a flow diagram of one embodiment of a method of verifying a password. The method begins in a start step 205. In a step 210, a password attempt is received. In the illustrated embodiment, a user provides the password attempt as an input, perhaps via a keyboard or keypad. In a step 215, the password attempt is stored.

Next are undertaken steps to retrieve a stored password against which the password attempt will eventually be compared. A pointer is retrieved in a step 220. In a step 225, a formula is applied to the retrieved pointer. In a step 230 an offset is applied to the result of the step 160. In a step 235, the result of these operations is employed to search the one-time pad a one-time pad stored in memory. The search yields a key, which takes the form of a password in the embodiment of FIG. 2.

Figure 3:
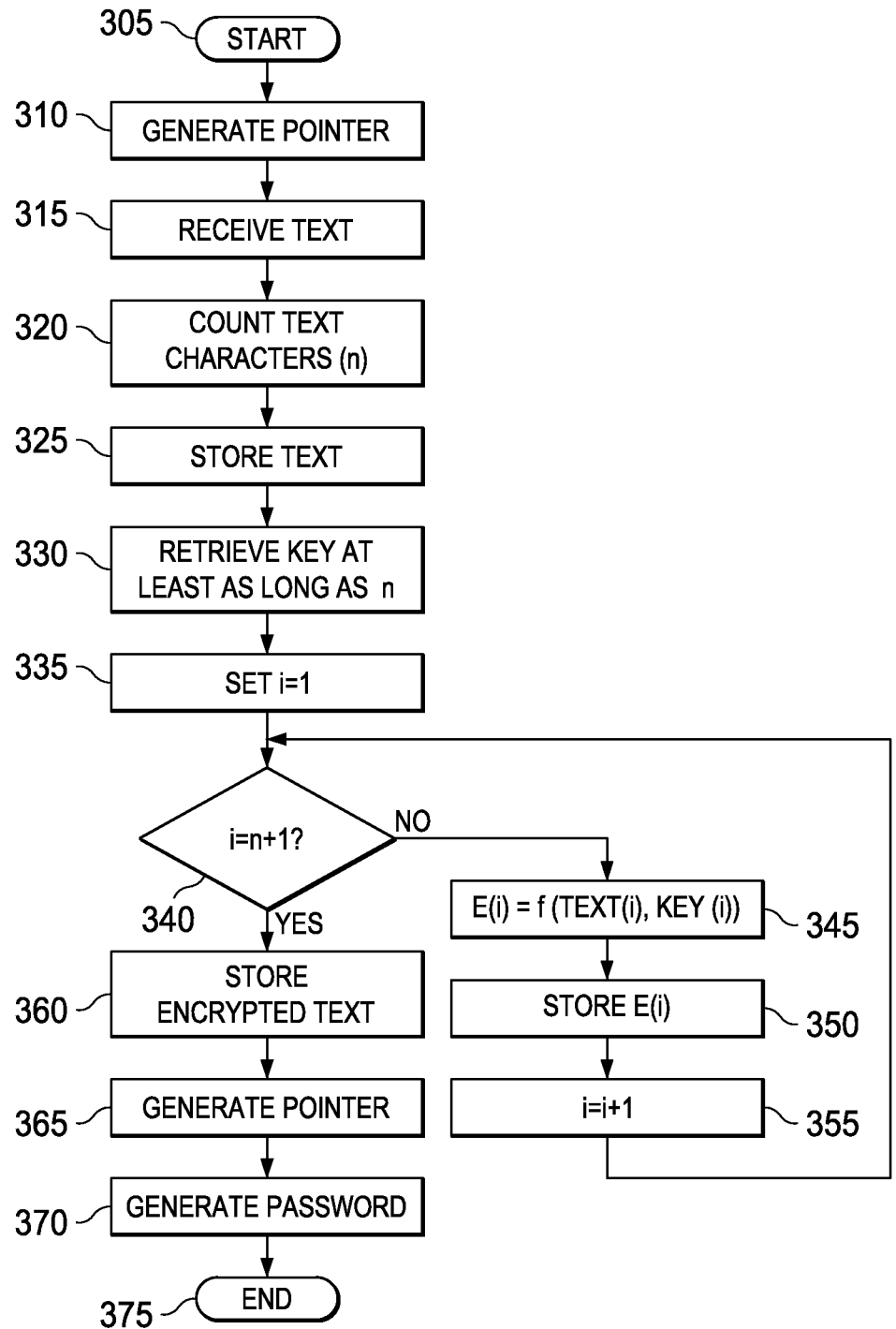
FIG. 3 is a flow diagram of one embodiment of a method of encrypting text using a key generated from a one-time pad.

In step 240, the password attempt is compared to the password retrieved from the one-time pad. If a match does not exist in a decisional step 245, a retry is initiated. In the embodiment of FIG. 3, the user is prompted in a step 250 to provide another password attempt. If a match does exist in the decisional step 245, a new pointer is generated in a step 255, and a new password is generated using the one-time pad in a step 260. The new password is made available to the user, and the method ends in an end step 265.

FIG. 3 is a flow diagram of one embodiment of a method of encrypting text using a key generated from a one-time pad. The method begins in a start step 305. A pointer is generated in a step 310. The text to be encrypted is received in a step 315. The number of characters in the text, n, is determined in a step 320. The text is stored in a step 325. Using the pointer generated in the step 310, a key is retrieved from the one-time pad that is at least as long as n in a step 330. Encryption can now begin.

In a step 335, a counter, i, is set to one. A decisional step 340 causes steps 345, 350 and 355 to be repeated for each i until i=n+1. In the step 345, an encrypted character, E(i), is determined based on a cryptographic function, f, the identity of the character in the text at i, TEXT(i), and the identity of the character in the key at i, KEY(i)). Thus, E(i)=f(TEXT(i),KEY(i)). In the step 350, E(i) is stored, and i is incremented in the step 355.

When i=n+1, the encoded text is stored in a memory device for subsequent transmission over a communication channel or display as part of an image on a display device as desired in a step 360, a new pointer is generated in a step 365, and a new password is generated in a step 370. The method ends in an end step 375.

Figure 4:
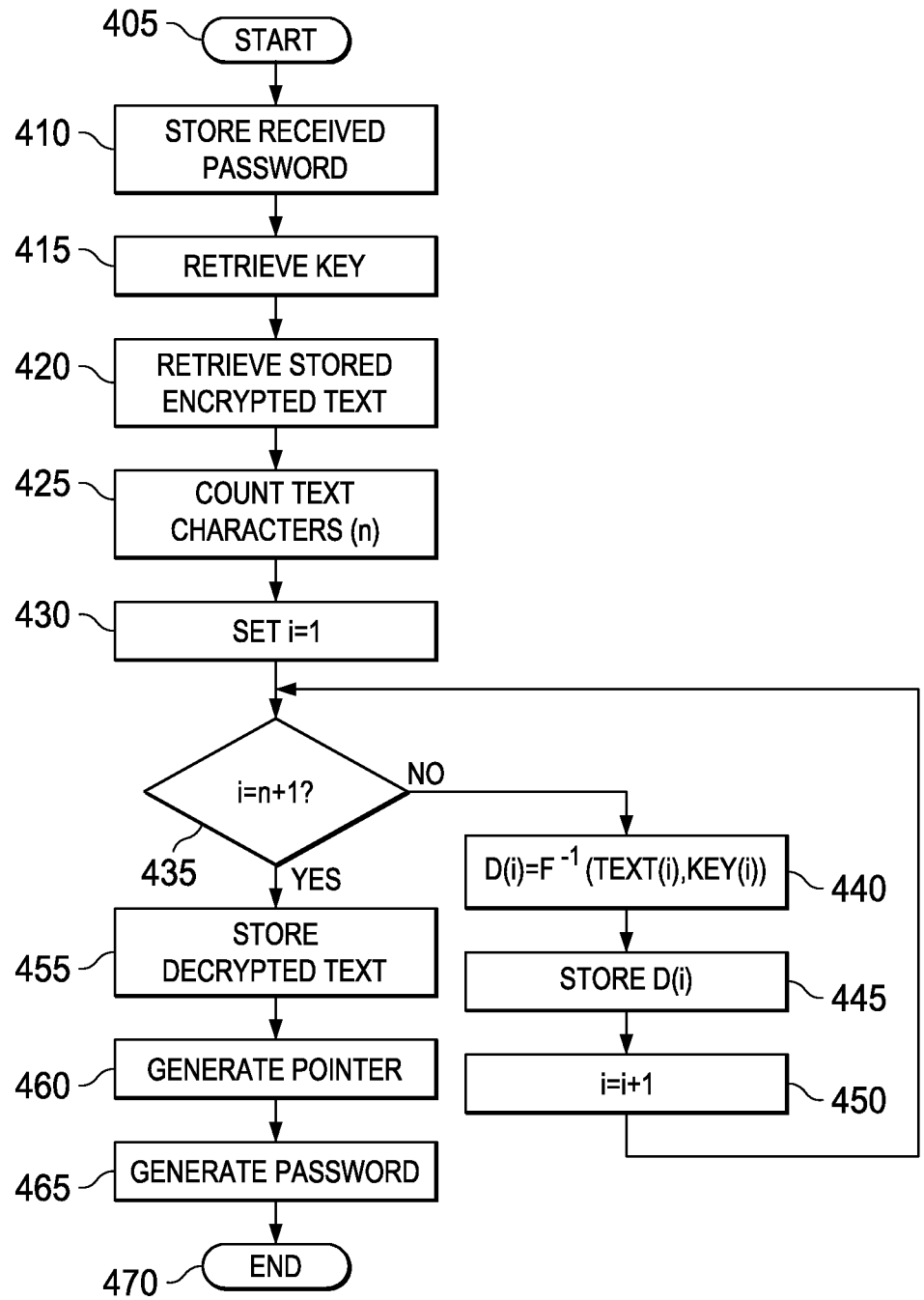
FIG. 4 is a flow diagram of one embodiment of a method of decrypting text using a key generated from a one-time pad.

FIG. 4 is a flow diagram of one embodiment of a method of decrypting text using a key generated from a one-time pad. The method begins in a start step 405. A password is received and stored in a step 410. Assuming the password matches, a key is retrieved from the one-time pad using the password as a pointer in a step 415. The text to be decrypted is retrieved in a step 420. The number of characters in the text, n, is determined in a step 425. Decryption can now begin.

In a step 430, a counter, i, is set to one. A decisional step 435 causes steps 440, 445 and 450 to be repeated for each until i=n+1. In the step 440, a decrypted (plaintext) character, D(i), is determined based on a cryptographic function, $f^{-1}$, the identity of the character in the text at i, TEXT(i), and the identity of the character in the key at i, KEY(i)). Thus, D(i)=$f^{-1}$(TEXT(i),KEY(i)). In the step 445, D(i) is stored, and i is incremented in the step 450.

When i=n+1, the decoded text is stored in a memory device for subsequent transmission over a communication channel or display as part of an image on a display device as desired in a step 455, a new pointer is generated in a step 460, and a new password is generated in a step 465. The method ends in an end step 470.

Figure 5:
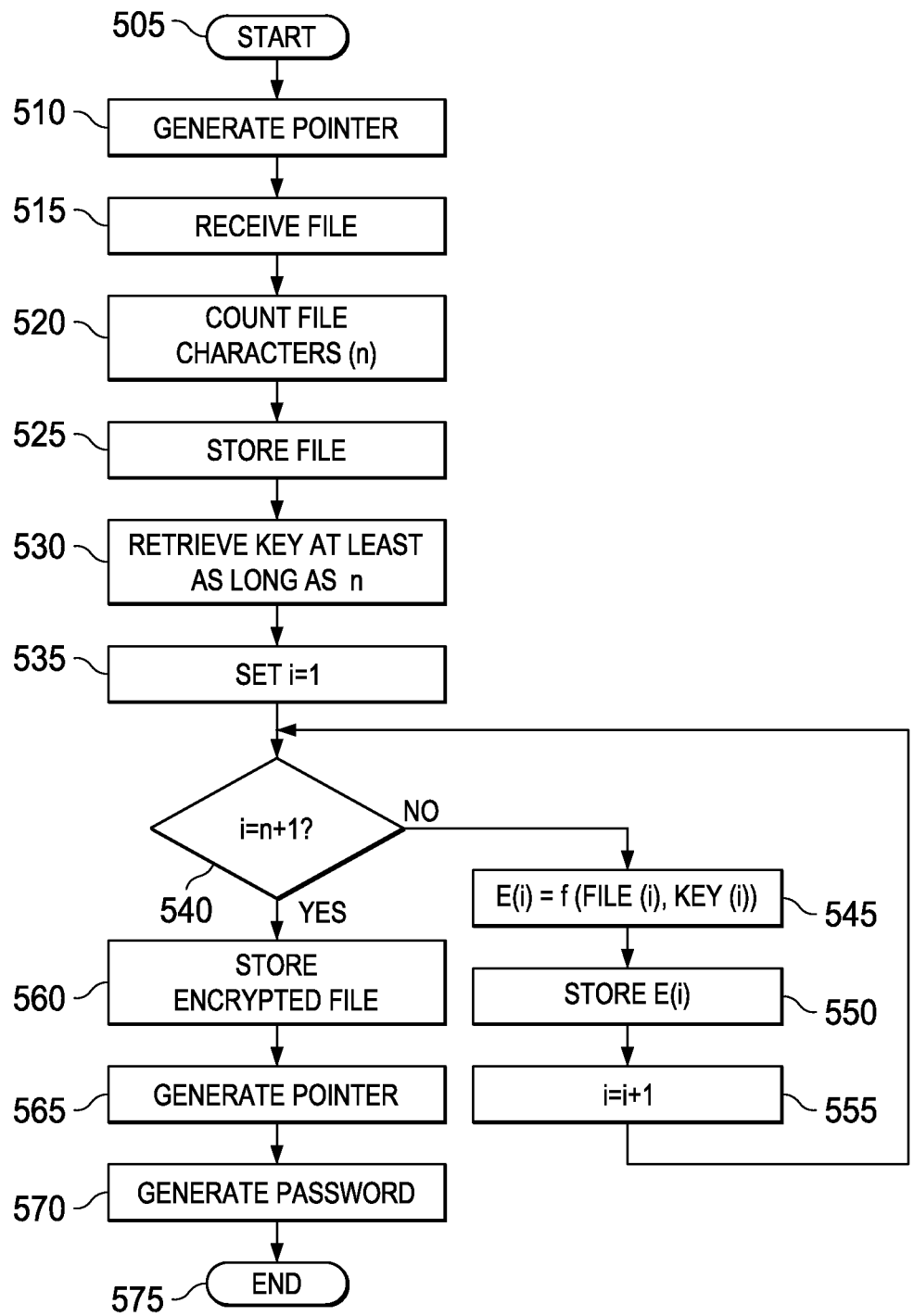
FIG. 5 is a flow diagram of one embodiment of a method of encrypting a file using a key generated from a one-time pad.

FIG. 5 is a flow diagram of one embodiment of a method of encrypting a file using a key generated from a one-time pad. The method begins in a start step 505. A pointer is generated in a step 510. The file to be encrypted is received in a step 515.

The number of characters in the file, n, is determined in a step 520. The file is stored in a step 525. Using the pointer generated in the step 510, a key is retrieved from the one-time pad that is at least as long as n in a step 530. Encryption can now begin.

In a step 535, a counter, i, is set to one. A decisional step 540 causes steps 545, 550 and 555 to be repeated for each until i=n+1. In the step 545, an encrypted character, E(i), is determined based on a cryptographic function, f, the identity of the character in the file at i FILE(i), and the identity of the character in the key at i KEY(i)). Thus, E(i)=f(FILE(i),KEY(i)). In the step 550, E(i) is stored, and i is incremented in the step 555.

When i=n+1, the encoded file is stored in a memory device for subsequent transmission over a communication channel or display as part of an image on a display device as desired in a step 560, a new pointer is generated in a step 565, and a new password is generated in a step 570. The method ends in an end step 575.

Figure 6:
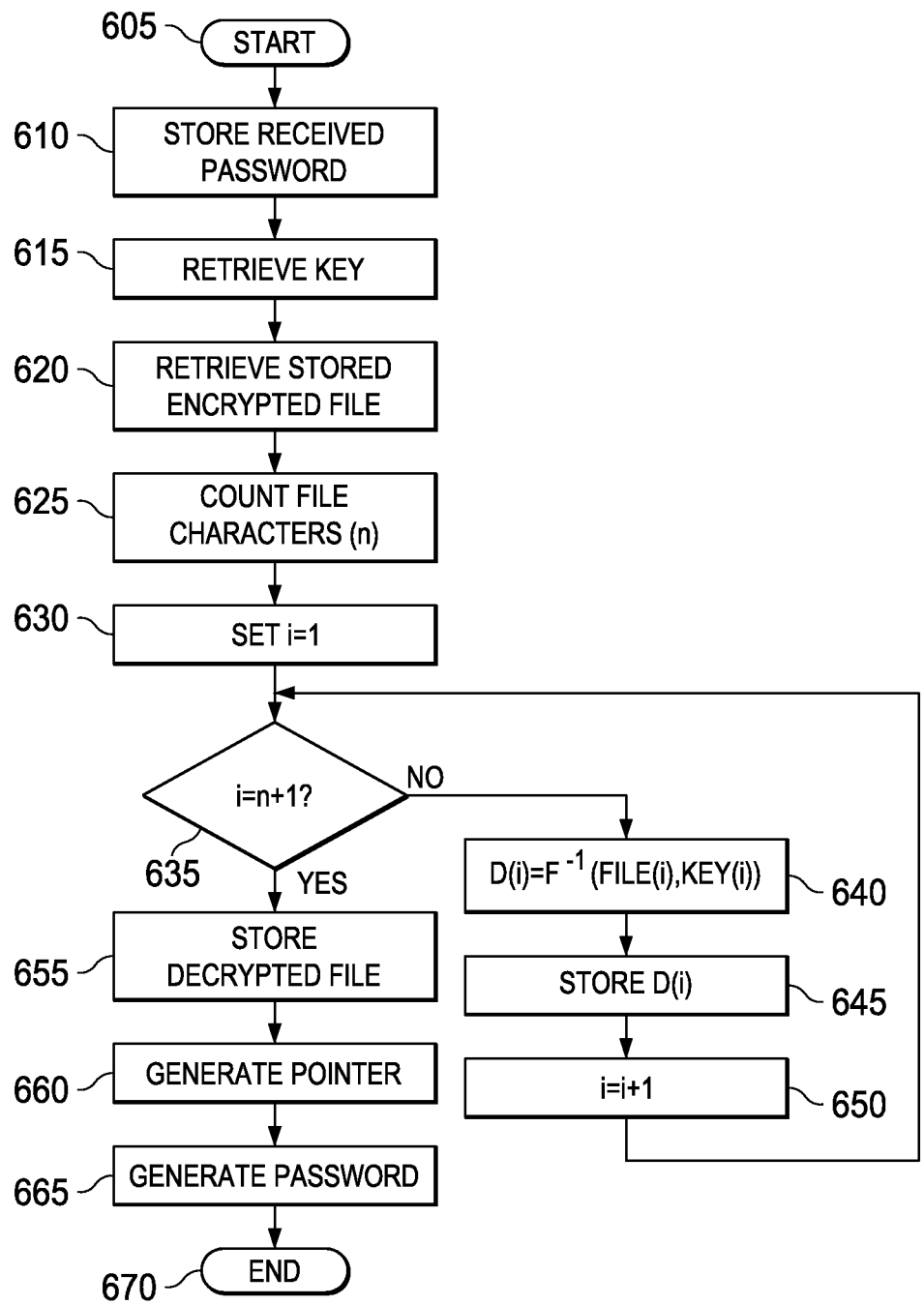
FIG. 6 is a flow diagram of one embodiment of a method of decrypting a file using a key generated from a one-time pad.

FIG. 6 is a flow diagram of one embodiment of a method of decrypting a file using a key generated from a one-time pad. The method begins in a start step 605. A password is received and stored in a step 610. Assuming the password matches, a key is retrieved from the one-time pad using the password as a pointer in a step 615. The file to be decrypted is retrieved in a step 620. The number of characters in the file, n, is determined in a step 625. Decryption can now begin.

In a step 630, a counter, i, is set to one. A decisional step 635 causes steps 640, 645 and 650 to be repeated for each i until i=n+1. In the step 640, a decrypted (plaintext) character, D(i), is determined based on a cryptographic function, $f^{-1}$, the identity of the character in the file at i, FILE(i), and the identity of the character in the key at i, KEY(i)). Thus, $D(i)=f^{-1}(FILE(i),KEY(i))$. In the step 645, D(i) is stored, and i is incremented in the step 650.

When i=n+1, the decoded file is stored in a memory device for subsequent transmission over a communication channel or display as part of an image on a display device as desired in a step 655, a new pointer is generated in a step 660, and a new password is generated in a step 665. The method ends in an end step 670.

For example, the user's password according to the above formula-applied pointer may be the word "Talk." After the user successfully enters a password, "Talk," a new, pseudorandom pointer, for example, "719-533-7969," may be generated and displayed as an image on a computer display device to the user. Applying the user's predefined formula yields a new password, page 102, line 44, word 15, or the word "Sort." Uses to encrypt a message, data or file may be accomplished in essentially the same manner, automatically and without user intervention once the correct key is entered by the user, by applying the pointer to the "one-time pad" to generate the encryption key. For example, using a pointer of "703-308-4357" and the above formula would lead to an encryption key from the one-time pad of "slivovitz brash adjective a brash man self-assertive, pushy, cocksure, cocky, self-confident, arrogant, bold, audacious, brazen, bumptious, overweening, puffed-up, forward, impudent, insolent, rude . . . ." This key is then stripped of repetitive words and non-alphabetic characters, yielding the following string:

"slivovitzbrashadjectiveamanselfassertivepushycocksure cockyselfconfidentarrogant-
boldaudaciousbrazenbumptious overweeningpuffedup-
forwardimpudentinsolentrude . . ."

This string may then be automatically applied (ciphered) to the message to produce an encrypted message, for example for the message "THIS IS A TEST MESSAGE," using a simple numeric substitution (0 for <space>; 1 for A; 2 for B, etc., with punctuation marks assigned values that follow 26), summation with scale of 0 to 50. It should be noted that the relatively simple numeric substitution described above as an example combination technique of summation shown below can be substituted with any other one-to-one mathematical technique, such as subtraction, multiplication, division and/or shifting without carry) and re-substitution cipher. It should also be noted that the manner in which the key is applied to the clear text message is referred to as the cipher. In this example the cipher is simple summation after conversion from an alpha-symbol-numeric character to a numeric representation of such), would be converted to:

$$T(20)+s(19)((39)$$

$$H(8)+I(12)=T(20)$$

$$I(9)+i(9)=R(18)$$

$$S(19)+v(22)=-(41)$$

$$<sp>(0)+o(15)=O(15)$$

$$I(9)+v(22)=!(31)$$

$$S(19)+i(9)=,(28)$$

$$<sp>(0)+t(20)=T(20)$$

$$A(1)+z(26)=.(27)$$

$$<sp>(0)+b(2)<B(2)$$

$$E(5)+a(1)=F(6)$$

$$S(19)+8(19)=*(38)$$

$$T(20)+h(8)=,(28)$$

$$<sp>(0)+a(1)=A(1)$$

$$M(13)+d(4)=Q(17)$$

$$E(5)+j(10)=O(15)$$

$$S(19)+e(5)=X(24)$$

$$S(19)+c(3)=V(22)$$

$$A(1)+t(20)=U(21)$$

$$G(7)+i(9)=P(16)$$

$$E(5)+v(22)=.(27)$$

Thereby converting the message "THIS IS A TEST MESSAGE" to "(TR-O!,T.BT*,AQOXVUP".

Without access to the pointer, the offset applied to the pointer, the formula applied to the pointer, the one-time pad, and the cipher applying the pointer to passage in the one-time pad to the message, it should be effectively impossible to decode the encoded message. Because the pointer is likely to be changed with each use, the offset and the formula are likely to be set by the user, the one-time pad is chosen by the user, and the cipher is either set by the user, or in cases where there is no need to communicate the cipher, generated by a pseudorandom process by the system, near-perfect security is attained with relatively low user inconvenience and while maintaining the ability of the user to access one or more messages, data or files without having to leave a master password with another person.

Naturally, more sophisticated substitution and/or shifting ciphers, typically including decoy padding characters to change the apparent length of the encoded message, can, and typically would, be employed in certain embodiments, this example is selected for its simplicity and for its understandability. The reverse of this can, of course, be employed for decryption since the encryption described herein is symmetric.

Figure 7:
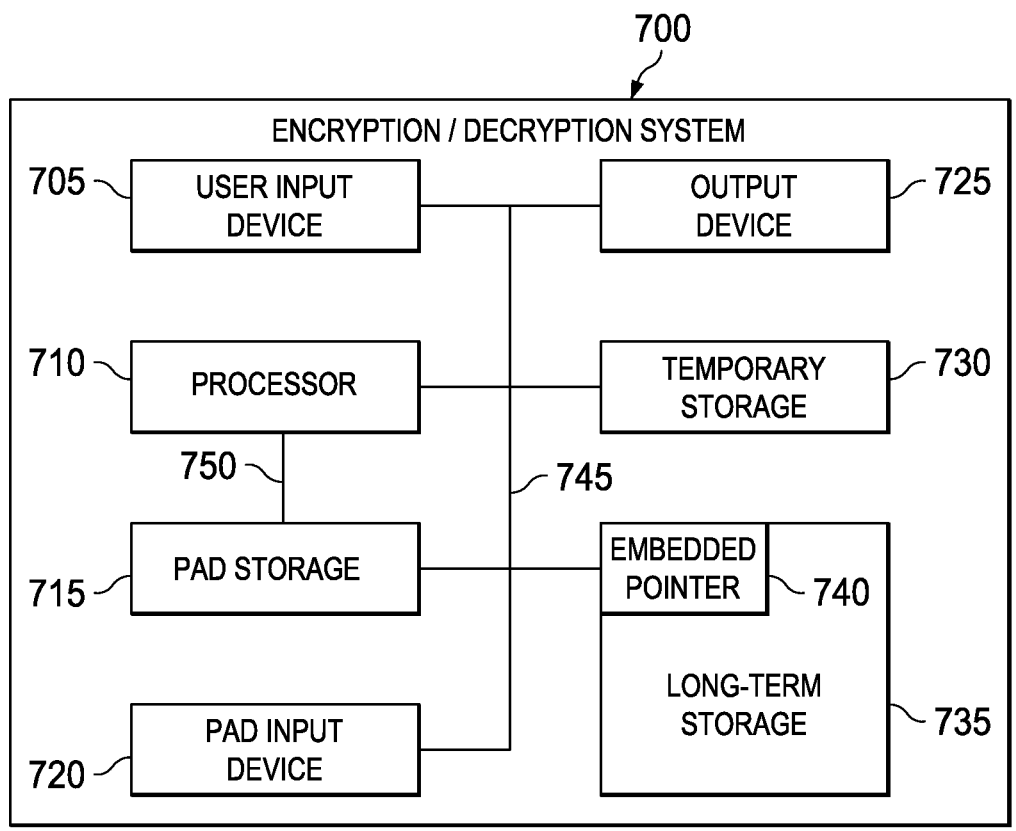
FIG. 7 is a block diagram of one embodiment of an encryption/decryption system.

Various embodiments of a system suitable for carrying out various of the embodiments described above will now be described in conjunction with FIG. 7. FIG. 7 is a block diagram of one embodiment of an encryption/decryption system 700. In one embodiment to be illustrated and described, the system 700 includes a user input device 705, a processor 710, one-time pad storage 715, a pad input device 720, an output device 725, temporary storage 730 and long-term storage 735 configured to store, among other things, an embedded pointer 740. An internal bus 745 couples the user input device 705, the processor 710, the one-time pad storage 715, the pad input device 720, the output device 725, the temporary storage 730 and the long-term storage 735 together. A pad bus 750 may directly couple the processor 710 and the pad storage 715.

The user input device 705 is configured to allow a user to enter control and access data. In various embodiments, the user input device 705 is one or more of a keyboard, mouse, trackball, touch screen, optical scanner, microphone or camera.

The processor 710 is configured to provide data processing functionality, e.g., to receive data, perform searches and comparisons, use pseudorandom number techniques to generate references to one-time pads, encrypt, decrypt and communicate and display data. In the illustrated embodiment, the processor 710 also performs standard management functions pertaining to the system 700. Some embodiments employ a standard, commercially available microprocessor. Other embodiments employ a processor that has been optimized to increase its high speed searching and comparison functionality.

The one-time pad storage 715 is configured to store a user-selected one-time pad. In the illustrated embodiment, the one-time pad storage 715 includes a substantial amount (e.g., three GB, perhaps more or less) electrically programmable (e.g., "flash") memory.

In one embodiment, the one-time pad storage 715 is provided with an internal security mechanism (not shown). The internal security mechanism is configured to inhibit unauthorized access to the one-time pad storage 715 by destroying its contents (including the one-time pad) if forced access is attempted. One mechanism for internal memory destruction includes high voltage surge caused by the sudden release of current from an internal capacitor causing the internal conductors to the memory to be destroyed in a manner similar to that of "blowing a fuse." In alternative embodiments, the memory is destroyed through the application of caustic chemicals, perhaps released from a vial integral with the circuit package upon detection of an authorized access, or by the application of extreme heat from an internal battery-powered heat source. Other alternative embodiments bring about memory destruction through rapid rewrite/overwrite of the stored pad information with other data. In one alternative embodiment, the one-time pad storage 715 may also include a location for the storage of the pointer for use in the next access to the one-time pad (i.e., the embedded pointer 740).

The illustrated embodiment of the one-time pad storage 715 is capable of operating in three modes. In a loading mode, the one-time pad storage 715 receives the user-selected pad and related reference information (e.g., chapter, section, page, line, column, paragraph numbering) which is typically received from the one-time pad input device 720 via the internal bus 745 and under the control of the processor 710. In a security confirmation mode, the one-time pad storage 715 uses the stored pointer (e.g., the embedded pointer 740), which may or may not be encrypted, to identify the security characters of interest and provides the security characters (which may or may not be encrypted) to the processor 710 for comparison with the user's security input. In a data destruction mode, the stored one-time pad information is destroyed as a result of the detection of an attempted unauthorized access.

The output device 725 is configured to provide a mechanism for communication with the user. In various embodiments, the output device includes a standard computer display device, cathode ray tube (CRT), liquid crystal display (LCD), light-emitting diode (LED) array, projector or other visual display device. In alternative embodiments, the output device 725 communicates audibly, e.g., through a computer speaker, or through a paper printer device.

The temporary storage 730, which may include random-access memory (RAM), is used in conjunction with the processor 710 to store interim data from the one-time pad storage 715 along with user data for comparison. Because various of the embodiments described herein make use of intermediate calculations and creation of an encoded encrypted data, the temporary storage 730 may be employed to store interim data, including a clear text message, the key and the enciphered encoded message.

The long-term storage 735 is configured to store a file (e.g., a graphic or sound file) that includes one or more embedded pointers to one or more corresponding locations within the pad storage 715 for the start of one or more keys. It will be recalled that, in the embodiments that use a key as an encryption key for the encryption of files, a pointer is maintained along with a cross-reference to the encrypted file. In the embodiments that use the key only as a password, the pointer would only need to be stored temporarily, that is from its generation in a user session to its use as a password for the next user session, during which the pointer would be likely replaced with a pointer to be used as a password during the next user session.

The embedded pointer 740 is configured to point to the start of the key within the one-time pad stored in the pad storage 715. The start of the key may be a modified version of the pointer where the modification is made by application of one or more of a user-selected offset and formula. In one embodiment, the pointer is converted from a decimal form to a binary form, then superimposed bit-by-bit on a predominantly non-textual file, where its existence will be obscured.

The internal bus 745 is configured to provide communication, presently electrical communication, between the various components of the system 700. In the illustrated embodiment, the internal bus 745 is a standard data, address and control bus. In alternative embodiments, the internal bus is be a combination of one or more of electrical, wireless, optical or other methods of communication.

The pad input device 720 is configured to allow the user to provide the user-selected pad. In the illustrated embodiment, the pad input device 720 includes a conventional digital scanner capable of optically scanning pages of text and of converting the resulting data into a digital form for storage in a memory device while maintaining the chapter, page, line, and word spacing formatting and/or identification. In alternative embodiments, the pad input device 720 is a device for inputting previously digitized textual information acquired on-line by way of a download of a selected common document, or from other digital data sources, such as compact discs (CDs), digital versatile discs (DVDs) or the like.

A pad bus 750 may be included to provide direct processor to pad storage device bus communication to expedite and facilitate the use of the key, identified from the one-time pad, to be used as a password. Of course, the internal bus 745 may be used for such purpose instead or additionally. In the illustrated embodiment, the pad bus 750 is an electrical bus, although in other alternative embodiments, the internal bus may be a combination of one or more of electrical, wireless, optical or other methods of communication.

Those skilled in the art to which this application relates will appreciate that other and further additions, deletions, substitutions and modifications may be made to the described embodiments.

What is claimed is:

1. A method of verifying a password, comprising:
   receiving a password attempt;
   retrieving, from a computer memory, a single pointer to a position in a common document;
   applying at least one of a formula and an offset to said pointer;
   retrieving a password by searching said common document stored in said computer memory based on said pointer and said formula or said offset, wherein said pointer includes either a page number and line number of said common document or a chapter number and a paragraph number of said common document;
   comparing said password attempt with said password; and
   generating and storing in said computer memory a new pointer to a different position in said common document if said password attempt matches said password.

2. The method as recited in claim 1 wherein said offset is a user-selected offset.

3. The method as recited in claim 1 wherein said pointer is formatted such that it appears to be a telephone number.

4. The method as recited in claim 1 further comprising generating a new password based on said new pointer.

5. The method as recited in claim 4 further comprising displaying said new password to a user on an output device.

6. The method as recited in claim 1 wherein said retrieving a password by searching said common document is based on said pointer, said formula and said offset.

* * * * *